United States Patent Office 3,105,087
Patented Sept. 24, 1963

3,105,087
OXYESTERS OF 1,2,3,4,9,9-HEXACHLORO-1,4a,5,6,
7,8,8a-OCTAHYDRO - 1,4 - METHANONAPHTHY-
LENE-6,7-DICARBOXYLIC ACID
Carleton W. Roberts, Midland, and Daniel H. Haigh,
Beaverton, Mich., assignors to The Dow Chemical
Company, Midland, Mich., a corporation of Delaware
No Drawing. Filed Nov. 24, 1961, Ser. No. 154,902
5 Claims. (Cl. 260—468)

This invention relates to novel functional esters of a halogen-containing Diels Alder adduct. More particularly, it is concerned with esters of aliphatic polyhydric alcohols and the Diels-Alder adduct of hexachlorocyclopentadiene and tetrahydrophthalic acid or its anhydride and with a method for making them.

These new compounds have the structure

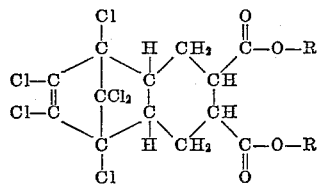

wherein each R is independently selected from the group consisting of hydrogen and the residue of an aliphatic polyhydric alcohol, not more than one R being hydrogen. The compounds included are, therefore, the monoesters and diesters of the adduct of hexachlorocyclopentadiene and tetrahydrophthalic acid or its anhydride with a saturated aliphatic polyhydric alcohol or an ether alcohol such as ethylene glycol, propylene glycol, 1,3-propanediol, 1,4-butanediol, diethylene glycol, dipropylene glycol, triethylene glycol, glycerol, 1,2,3-butanetriol, trimethylolethane, trimethylolpropane, pentaerythritol, erythritol, arabitol, sorbitol, mannitol, and similar polyols, including sugars such as glucose and sucrose.

The adduct of hexachlorocyclopentadiene and tetrahydrophthalic anhydride, preferably employed as a starting material, is a crystalline solid melting at a temperature of about 275° C. It is more precisely named according to the system of nomenclature employed by Chemical Abstracts as 1,2,3,4,9,9-hexachloro-1,4,4a,5,6,7,8,8a-octahydro-1, 4-methanonaphthalene-6,7-dicarboxylic anhydride and it has the structure:

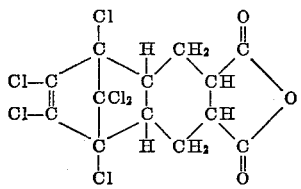

This adduct anhydride can be prepared by a procedure described in our pending application Serial No. 48,823, filed August 11, 1960, and now abandoned.

In brief, the adduct anhydride is prepared by a Diels-Alder type reaction by heating approximately equimolar proportions of hexachlorocyclopentadiene and tetrahydrophthalic anhydride in admixture with one another in an inert organic solvent such as heptane, toluene, xylene, ethylbenzene, chlorobenzene, dichlorobenzene, and the like at elevated temperatures between about 150–200° C. The product separates from the reaction mixture as a solid which may be separated by filtering and purified by recrystallization from a suitable solvent.

The esters which are the subject of this invention are prepared by reaction of the adduct anhydride or the corresponding dicarboxylic acid with an aliphatic polyhydric alcohol of the class described using conventional esterification procedures. Instead of esterifying the adduct anhydride or acid with a single such polyol, a mixture of two or more polyols may be employed to obtain mixed esters. One or both carboxyl groups in the adduct molecule may be reacted with a polyol on the basis of one carboxyl group to one polyol molecule to make either a monoester or a diester according to the ratio of reactants and the reaction conditions used.

Generally, monoesters are easily made by heating together approximately equimolar proportions of the polyol and, preferably, the adduct anhydride, usually in an inert solvent solution, for a relatively short time and conveniently at the reflux temperature of the solvent solution. The preparation of diesters requires more stringent reaction conditions. An esterification catalyst is usually required and ordinarily an excess of polyol over the theoretical two moles per mole of adduct is employed, the excess polyol serving as the reaction solvent. Relatively higher reaction times or temperatures or both are often necessary. The preparation of diesters of bulky, branched chain polyols offers particular difficulty.

Specifically, the esterification is preferably carried out under a blanket of an inert gas such as nitrogen, argon, or carbon dioxide, nitrogen being the gas of choice, in a conventional esterification apparatus with means for removing and collecting the water formed in the reaction. The ester product may be removed from the reaction mixture and purified, if desirable, by standard methods for such procedures. Suitably, the lower-boiling unreacted ingredients and solvent, if any may be removed by distillation after neutralization of the acid esterification catalyst which may be present, leaving a distillation residue composed essentially of the ester product. This may be further purified by high vacuum distillation, for example, in a molecular still, or it may be crystallized where the product is a solid.

The preparation of the compounds which are the subject of this invention is illustrative by the following examples but it is to be understood that the scope of the invention is not limited thereby.

Example 1

(A) A charge of 544 grams (2 moles) of hexachlorocyclopentadiene and 304 grams (2 moles) of cis-4-cyclohexene-1,2-dicarboxylic anhydride (tetrahydrophthalic anhydride), together with 1500 ml. of ortho-dichlorobenzene as solvent and reaction medium was placed in a glass reaction vessel equipped with a reflux condenser and stirrer. The mixture was stirred and heated at reflux temperature for a period of 29 hours, then was allowed to cool to room temperature. The product, a crystalline solid, was separated by filtering and was recrystallized from methyl ethyl ketone. There was obtained 525 grams of product as a white crystalline material having a melting point of 275–276° C. The product was 1,2,3,4,9,9-hexachloro - 1,4,4a,5,6,7,8,8a - octahydro-1,4-methanonaphthalene-6,7-dicarboxylic anhydride, having the structural formula

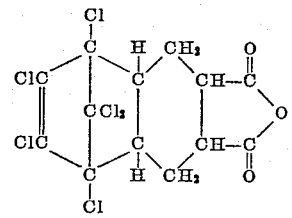

(B) A 2 liter round bottomed flask equipped with a reflux condenser and a nitrogen inlet tube was charged with 424.8 g. of the anhydride product prepared in part A above, 98 g. of 95% glycerol, and one liter of ethyl acetate reaction solvent. After heating at reflux temperature under nitrogen for 8 hours, 150 ml. of p-dioxane was added and heating at reflux temperature was continued for another 8 hours. Approximately a liter of ethyl acetate was then distilled from the reaction flask and the remaining reaction mixture was heated at reflux temperature for an additional 96 hours. The dioxane was evaporated under reduced pressure and the residue was washed six times with water, dried, and decolorized by filtering through activated charcoal. The product was a nearly colorless viscous liquid. Elemental analysis showed: C, 38.1%; H, 3.21%; Cl, 41.0%. Calculated for $$C_{16}H_{16}Cl_6O_6:$$

C, 37.17%; H, 3.12%; Cl, 41.15%. Infrared examination confirmed the structure of the product as that of the 2,3-dihydroxypropyl hydrogen ester.

Example 2

A flask such as used in Example 1(B) but additionally equipped with a stirrer and a water-collecting trap connected to the reflux condenser was charged with a mixture of 424.8 g. of the anhydride product of Example 1(A), 765 g. of glycerol, and 2 g. of p-toluenesulfonic acid. The reaction mixture was heated at reflux temperature under a blanket of nitrogen for 21 hours, at the end of which time there had been collected about the theoretical amount of water based on diesterification of the anhydride. The cooled reaction mixture was neutralized by washing with dilute aqueous potassium carbonate and then extracted with chloroform. The chloroform solution was washed with water, dried, and decolorized with activated charcoal. Evaportaion of the chloroform under reduced pressure left as a residue a white glass-like material which was further dried at 40° C. under reduced pressure. Found by elemental analysis: C, 38.92%; H, 3.05%; Cl, 35.3%. Calculated for $C_{19}H_{22}O_8Cl_6$: C, 38.61%; H, 3.75%; Cl, 35.99%. Infrared examination showed the product to be the bis-(2,3-dihydroxypropyl)ester.

Example 3

A reaction flask such as described in Example 2 was charged with 212 g. of the anhydride product of Example 1(A), 120 g. of trimethylolethane (2-hydroxymethyl-2-methyl-1,3-propanediol), a catalytic quantity of p-toluenesulfonic acid, and 400 ml. of dry toluene. This reaction mixture was heated at reflux temperature for 24 hours. The cooled mixture was then neutralized, washed, and extracted with chloroform as described in Example 2. The chloroform was evaporated from the extract under reduced pressure and the residue was triturated in hot n-heptane. The white crystalline product was separated by filtration and dried, M.P. 65–75° C. Analysis: C, 43.4%; H, 4.39%; Cl, 35.0%. Calculated for $$C_{23}H_{30}O_8Cl_6:$$

C, 42.7%; H, 4.67%; Cl, 32.9%. Infrared examination showed that this material was essentially the bis-(3-hydroxy-2-hydroxymethyl-2-methylpropyl)ester.

Example 4

A flask such as used in Example 2 was loaded with 106 g. of the anhydride product of Example 1(A), 34 g. of pentaerythritol, and 400 ml. of p-dioxane. The resulting heterogeneous mixture was heated at reflux temperature for 98 hours, yielding a cloudy yellowish reaction mixture. This was filtered to give a clear yellow solution which was evaporated under reduced pressure to remove the dioxane solvent. The residue was a yellow viscous material representing better than 90% yield of the expected monoester. Elemental and infrared analyses confirmed the structure of the product.

The esters of the above examples may also be prepared using the free dicarboxylic acid in place of the anhydride as shown here.

By the methods in the above examples, the anhydride adduct of Example 1(A) may be reacted with ethylene glycol to make either the 2-hydroxyethyl hydrogen ester or the bis(2-hydroxyethyl)ester, with propylene glycol to make the 2-hydroxypropyl hydrogen ester or the bis-(2-hydroxypropyl)ester, with diethylene glycol to make the 2-(2-hydroxyethoxy)ethyl mono and diester, and with other polyols as previously described under appropriate reaction conditions to make similar monoesters and diesters.

The aliphatic polyhydric alcohol monoesters and diesters which constitute this invention are useful as intermediates for the preparation of polyesters having fire-retardant and other valuable properties. Particularly preferred for such use are the esters having at least two hydroxyl groups in the molecule which are available for reaction with polycarboxylic acids such as adipic acid and terephthalic acid.

The monoesters, having free carboxyl and hydroxyl groups, can be converted to polyester resins by simply heating them under esterification conditions.

These polyol esters are also valuable as such as compatible and fire-retardant plasticizers for polyvinyl chloride and ethylcellulose resinous compositions.

We claim:
1. A compound of the formula

wherein each R is independently selected from the group consisting of hydrogen and the residue obtained by removing a hydrogen atom from one hydroxyl group of an alcohol selected from the group consisting of saturated aliphatic hydrocarbon polyhydric alcohols and ether alcohols containing 2–12 carbon atoms and 2–8 hydroxyl groups, not more than one R being hydrogen.

2. 2,3 - dihydroxypropyl hydrogen 1,2,3,4,9,9 - hexachloro-1,4,4a,5,6,7,8,8a - octahydro - 1,4 - methanonnaphthalene-6,7-dicarboxylate.

3. Bis(2,3 - dihydroxypropyl) 1,2,3,4,9,9 - hexachloro-1,4,4a,5,6,7,8,8a - octahydro-1,4-methanonaphthalene-6,7-dicarboxylate.

4. 3-hydroxy-2,2-bis(hydroxymethyl)propyl hydrogen 1,2,3,4,9,9 - hexachloro - 1,4,4a,5,6,7,8,8a - octahydro-1,4-methanonaphthalene-6,7-dicarboxylate.

5. Bis(3-hydroxy-2-hydroxymethyl - 2 - methylpropyl) 1,2,3,4,9,9 - hexachloro - 1,4,4a,5,6,7,8,8a - octahydro-1,4-methanonaphthalene-6,7-dicarboxylate.

References Cited in the file of this patent
UNITED STATES PATENTS 2,779,701     Robitschek et al. _____ Jan. 29, 1957